United States Patent Office 2,768,174
Patented Oct. 23, 1956

2,768,174

PROCESS FOR PRODUCING VINYL ETHER DERIVATIVES

Raymond Etienne Paul, Versailles, and Serge Tchelitcheff, Vitry-sur-Seine, France, assignors to Societe des Usines Chimiques Rhone-Poulenc, Paris, France, a corporation of France No Drawing. Application February 23, 1956, Serial No. 567,075

Claims priority, application France March 4, 1955

10 Claims. (Cl. 260—345.1)

This invention relates to the production of vinyl ether derivatives and particularly to the production of such derivatives by the condensation of phosgene with vinyl ether.

The term "vinyl ether" used in the present specification is to be understood to mean a compound of the general Formula I

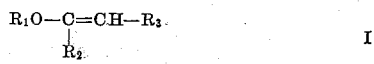

where R₁ is an alkyl radical containing up to 4 carbon atoms or together with R₃ completes a 4:5-dihydrofuran or 5:6-dihydropyran ring, R₂ is a hydrogen atom or an alkyl radical containing up to 4 carbon atoms and R₃ is a hydrogen atom or an alkyl radical containing up to 4 carbon atoms or, together with R₁, completes a 4:5-dihydrofuran or 5:6-dihydropyran ring.

It is known from United States Patent No. 2,464,747 that phosgene is reacted with a vinyl ether at temperatures of the order of 40°–60° C., the ether phosgene ratio being between 1:1 and 10:1, resins are obtained which consist of interpolymerisation products of phosgene and vinyl ether. It has further been found that similar interpolymerisation products are obtained if the operation is carried out at room temperature or below both when the compound used is a simple vinyl ether and when it is a 4:5-dihydrofuran. On the other hand, United States Patent No. 2,436,645 discloses that under the latter conditions the 5:6-dihydropyran, which contains the same grouping —O—CH=CH— in its molecule as the non-cyclic vinyl ethers, behaves differently and gives 2-chloro 2:3:5:6-tetrahydropyran 3-carboxylic acid chloride which, on heating, loses hydrochloric acid and is converted into 5:6-dihydropyran 3-carboxylic acid chloride.

According to the present invention a process for the production of vinyl ether derivatives comprises treating a vinyl ether as hereinbefore defined with phosgene at a temperature at most equal to room temperature in the presence of a tertiary base in a quantity not exceeding 0.2 mol equivalent per mol of phosgene. Under these conditions, the product of the reaction is non-resinous and consists of a mixture of β-alkoxylated acrylic acid chloride of the general Formula II

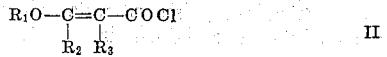

and of an α-chlorinated ether of the general Formula III

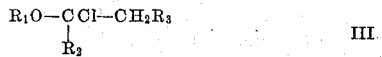

It will be noted that, in respect of compounds containing a 5:6-dihydropyran ring referred to above, there is obtained by the process of the present invention not only a compound according to Formula II (described in United States Patent No. 2,436,645) but also a compound of Formula III.

The relative proportions of vinyl ether and of phosgene used in the reaction may vary widely. The best yields are obtained by using equimolecular proportions, but an excess of one or the other can be used e. g. two molecules of one of the reactants to one molecule of the other.

The operation is carried out at a temperature equal to or lower than room temperature. An advantageous method of operation consists in mixing the reactants at low temperature, preferably between 0° and —10° C., and completing the reaction, if necessary, by allowing the reaction mixture to return to room temperature.

The tertiary base is advantageously used in the proportion of at least 0.02 mol equivalent per mol of phosgene, i. e. 0.02:1 to 0.2:1 and preferably in the proportion 0.1 mol. per molecule of phosgene employed.

By operating under the conditions indicated above the chlorinated ethers and the chlorides of β-alkoxylated acrylic acid (compounds of Formulae III and II) can be readily isolated by fractional distillation. It is also possible to convert the reaction products respectively into acetals:

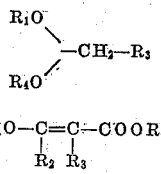

or into esters $$R_1O-C=C-COOR_4$$
$$\quad |\quad |$$
$$\quad R_2\ R_3$$

(R₄ being an alkyl or aryl group) by reaction with an alcohol in the presence of a base such as pyridine which is capable of neutralising the hydrochloric acid which is formed in the reaction. Such a method of operation is advantageous when the primary products (II) and (III) have low stability.

Many of the products according to the invention are known and have known utility as solvents or plasticisers or as intermediate products for the manufacture of solvents, plasticisers, dyestuffs or plastic materials.

The following examples will serve to illustrate the invention but are not to be regarded as limiting it in any way:

Example I 8 g. of triethylamine are added to 99 g. of phosgene maintained at 0° C., and 72 g. of ethyl vinyl ether are then run in over a period of 20 minutes while the temperature is maintained between 0° and —10° C. After standing for 48 hours at room temperature, the product is mixed with 150 cc. of diethyl ether. The remaining solid is removed by centrifuging and the liquid is distilled, yielding 41 g. of ethyl α-chloroethyl ether and 62 g. of β-ethoxy acryloyl chloride boiling at 88–90° C./20 mm. Hydrolysis of the latter gives β-ethoxy acrylic acid melting at 110° C. The chloride, treated with the theoretical equivalent of ethyl alcohol in the presence of pyridine gives ethyl β-ethoxy acrylate boiling at 87–91° C.

Example II 6 g. of triethylamine are added to 90 g. of phosgene maintained at 0° C., and 88 g. of ethyl ethylvinyl ether are then run in over a period of 15 minutes while keeping the temperature at 0° C. or below. After standing for 24 hours at room temperature, the mixture is mixed with 105 cc. of diethyl ether. The solid is removed by centrifuging and the liquid is distilled, yielding 36 g. of ethyl α-chlorobutyl ether and 91 g. of α-ethyl β-ethoxy acryloyl chloride boiling at 102–105° C./20 mm. Hydrolysis of the latter by means of caustic soda gives α-ethyl β-ethoxy acrylic acid melting at 72° C., while hydrolysis by means of hydrochloric acid gives butanal. The ethyl ester is prepared as in Example I and boils at 103–105° C./20 mm.

Example III

Following the procedure of Example I, but starting with 99 g. of phosgene and 70 g. of 2:3-dihydrofuran, 45 g. of 2-chlorotetrahydrofuran and 47 g. of 2:3-dihydrofuran-4-carboxylic acid chloride are obtained. The latter substance boils at 93–95° C./20 mm. and melts at 41° C. The corresponding acid melts at 181° C., and the ethyl ester boils at 94–96° C./20 mm.

*Example IV*

Following the procedure of Example I, but starting with 100 g. of butyl vinyl ether and 99 g. of phosgene, 45 g. of butyl α-chloroethyl ether and 77 g. of β-butoxy acryloyl chloride boiling at 116–120° C./20 mm. are obtained. The corresponding acrylic acid melts at 63° C. The ethyl and allyl esters boil at 118–120° C./20 mm. and 132–135° C./20 mm. respectively.

*Example V*

Following the procedure of Example I, but starting with 72 g. of phosgene and 61 g. of allyl-vinyl ether, 28 g. of allyl α-chloroethyl ether and 46 g. of β-allyloxy acrylol chloride boiling at 101–105° C./20 mm. are obtained. The corresponding acrylic acid melts at 73° C. The ethyl and allyl esters boil at 105–108° C./20 mm. and 117–120° C./20 mm. respectively.

*Example VI*

2 g. of triethylamine are added to 25 g. of phosgene cooled to 0° C., and 42 g. of 2-methyl-4:5-dihydrofuran are then run in over a period of 30 minutes. After standing for 30 minutes at 0° C., 100 cc. of anhydrous diethyl ether are added, and thereafter a solution of 23 g. of ethyl alcohol and 4 g. of pyridine in 200 cc. of anhydrous diethyl ether is added. After standing for one night, the solid is removed by centrifuging and the liquid is distilled. 18 g. of 2-methyl-2-ethoxy tetrahydrofuran and 20 g. of ethyl 2-methyl-5:6-dihydrofuran-3-carboxylate boiling at 97–100° C./20 mm. are obtained.

*Example VII*

8 g. of triethylamine are added to 100 g. of phosgene maintained at a temperature between −3° and −10° C., and 84 g. of dihydropyran are then run in over a period of 30 minutes. The mixture is then allowed to warm slowly so as to reach 20° C. in 16 hours, and it is left at this temperature for 48 hours. The product is then mixed with 100 cc. of diethyl ether, the solid is removed by centrifuging and the liquid is distilled. 33 g. of 2-chloro-tetrahydropyran and 62 g. of 5:6-dihydropyran-3-carboxylic acid chloride are thus obtained.

*Example VIII*

8 g. of diethylaniline (0.05 mol.) are added to 99 g. of phosgene at −10° C. and 72 g. of ethyl-vinyl ether are run in over a period of 30 minutes, the temperature being maintained between −3° and 0° C. The product is treated as in Example I and 42 g. of ethyl α-chloroethyl ether and 56 g. of β-ethoxyacryloyl chloride are obtained.

We claim:

1. A process for the production of vinyl ether derivatives which comprises treating with phosgene a vinyl ether of the general formula

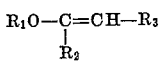

where $R_1$ taken individually is an alkyl group containing up to 4 carbon atoms, and taken together with $R_3$ completes with $R_3$ a ring system selected from the 4:5-dihydrofuran and 5:6-dihydropyran rings, $R_2$ is selected from the class consisting of the hydrogen atom and alkyl groups containing up to 4 carbon atoms and $R_3$ taken individually is selected from the class consisting of the hydrogen atom and alkyl groups containing up to 4 carbon atoms and taken together with $R_1$ completes a said ring system, the treatment being effected at a temperature at most equal to room temperature and in the presence of a tertiary base in a quantity at most 0.2 mol equivalent per mol of phosgene.

2. A process for the production of vinyl ether derivatives which comprises treating with phosgene a vinyl ether of the general formula

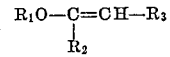

where $R_1$ taken individually is an alkyl group containing up to 4 carbon atoms, and taken together with $R_3$ completes with $R_3$ a ring system selected from the 4:5-dihydrofuran and 5:6-dihydropyran rings, $R_2$ is selected from the class consisting of the hydrogen atom and alkyl groups containing up to 4 carbon atoms and $R_3$ taken individually is selected from the class consisting of the hydrogen atom and alkyl groups containing up to 4 carbon atoms and taken together with $R_1$ completes a said ring system, the treatment being effected at 0° to minus 10° C. and in the presence of a tertiary base in a quantity at most 0.2 mol equivalent per mol of phosgene.

3. A process for the production of vinyl ether derivatives which comprises treating with phosgene a vinyl ether of the general formula

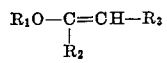

where $R_1$ taken individually is an alkyl group containing up to 4 carbon atoms, and taken together with $R_3$ completes with $R_3$ a ring system selected from the 4:5-dihydrofuran and 5:6-dihydropyran rings, $R_2$ is selected from the class consisting of the hydrogen atom and alkyl groups containing up to 4 carbon atoms and $R_3$ taken individually is selected from the class consisting of the hydrogen atom and alkyl groups containing up to 4 carbon atoms and taken together with $R_1$ completes a said ring system, the treatment being effected at a temperature at most equal to room temperature and in the presence of a tertiary base selected from the class consisting of triethylamine and diethylaniline in a quantity of 0.02 to 0.2 mol equivalent per mol of phosgene.

4. A process for the production of vinyl ether derivatives which comprises treating with phosgene a vinyl ether of the general formula

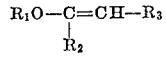

where $R_1$ taken individually is an alkyl group containing up to 4 carbon atoms, and taken together with $R_3$ completes with $R_3$ a ring system selected from the 4:5-dihydrofuran and 5:6-dihydropyran rings, $R_2$ is selected from the class consisting of the hydrogen atom and alkyl groups containing up to 4 carbon atoms and $R_3$ taken individually is selected from the class consisting of the hydrogen atom and alkyl groups containing up to 4 carbon atoms and taken together with $R_1$ completes a said ring system, the treatment being effected at 0° to minus 10° C. and in the presence of a tertiary base selected from the class consisting of triethylamine and diethylaniline in a quantity of 0.02 to 0.2 mol equivalent per mol of phosgene.

5. A process for the production of vinyl ether derivatives which comprises treating with phosgene a vinyl ether of the general formula

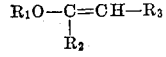

where $R_1$ taken individually is an alkyl group containing up to 4 carbon atoms, and taken together with $R_3$ completes with $R_3$ a ring system selected from the 4:5-dihydrofuran and 5:6-dihydropyran rings, $R_2$ is selected from the class consisting of the hydrogen atom and alkyl groups containing up to 4 carbon atoms and $R_3$ taken individually is selected from the class consisting of the hydrogen atom and alkyl groups containing up to 4 carbon atoms and taken together with $R_1$ completes a said ring system, the treatment being effected at a temperature at most equal to room temperature and in the presence of a tertiary base in a quantity at most 0.2 mol equivalent per mol of phosgene and separating the chlorinated ether product from the β-alkoxylated acrylic acid chloride produced by fractional distillation.

6. A process for the production of vinyl ether derivatives which comprises treating with phosgene a vinyl ether of the general formula $$R_1O-C(R_2)=CH-R_3$$

where $R_1$ taken individually is an alkyl group containing up to 4 carbon atoms, and taken together with $R_3$ completes with $R_3$ a ring system selected from the 4:5-dihydrofuran and 5:6-dihydropyran rings, $R_2$ is selected from the class consisting of the hydrogen atom and alkyl groups containing up to 4 carbon atoms and $R_3$ taken individually is selected from the class consisting of the hydrogen atom and alkyl groups containing up to 4 carbon atoms and taken together with $R_1$ completes a said ring system, the treatment being effected at 0° to minus 10° C. and in the presence of a tertiary base in a quantity at most 0.2 mol equivalent per mol of phosgene and separating the chlorinated ether product from the β-alkoxylated acrylic acid chloride produced by fractional distillation.

7. A process for the production of vinyl ether derivatives which comprises treating with phosgene a vinyl ether of the general formula $$R_1O-C(R_2)=CH-R_3$$

where $R_1$ taken individually is an alkyl group containing up to 4 carbon atoms, and taken together with $R_3$ completes with $R_3$ a ring system selected from the 4:5-dihydrofuran and 5:6-dihydropyran rings, $R_2$ is selected from the class consisting of the hydrogen atom and alkyl groups containing up to 4 carbon atoms and $R_3$ taken individually is selected from the class consisting of the hydrogen atom and alkyl groups containing up to 4 carbon atoms and taken together with $R_1$ completes a said ring system, the treatment being effected at a temperature at most equal to room temperature and in the presence of a tertiary base selected from the class consisting of triethylamine and diethylaniline in a quantity of 0.02 to 0.2 mol equivalent per mol of phosgene and separating the chlorinated ether product from the β-alkoxylated acrylic acid chloride produced by fractional distillation.

8. A process for the production of vinyl ether derivatives which comprises treating with phosgene a vinyl ether of the general formula $$R_1O-C(R_2)=CH-R_3$$

where $R_1$ taken individually is an alkyl group containing up to 4 carbon atoms, and taken together with $R_3$ completes with $R_3$ a ring system selected from the 4:5-dihydrofuran and 5:6-dihydropyran rings, $R_2$ is selected from the class consisting of the hydrogen atom and alkyl groups containing up to 4 carbon atoms and $R_3$ taken individually is selected from the class consisting of the hydrogen atom and alkyl groups containing up to 4 carbon atoms and taken together with $R_1$ completes a said ring system, the treatment being effected at 0° to minus 10° C. and in the presence of a tertiary base selected from the class consisting of triethylamine and diethylaniline in a quantity of 0.02 to 0.2 mol equivalent per mol of phosgene and separating the chlorinated ether product from the β-alkoxylated acrylic acid chloride produced by fractional distillation.

9. A process for the production of vinyl ether derivatives which comprises treating with phosgene a vinyl ether of the general formula $$R_1O-C(R_2)=CH-R_3$$

where $R_1$ taken individually is an alkyl group containing up to 4 carbon atoms, and taken together with $R_3$ completes with $R_3$ a ring system selected from the 4:5-dihydrofuran and 5:6-dihydropyran rings, $R_2$ is selected from the class consisting of the hydrogen atom and alkyl groups containing up to 4 carbon atoms and $R_3$ taken individually is selected from the class consisting of the hydrogen atom and alkyl groups containing up to 4 carbon atoms and taken together with $R_1$ completes a said ring system, the treatment being effected at a temperature at most equal to room temperature and in the presence of a tertiary base in a quantity at most 0.2 mol equivalent per mol of phosgene and separating the chlorinated ether product from the β-alkoxylated acrylic acid chloride produced by fractional distillation, and thereafter converting the chlorinated ether product into an acetal by reaction with an alcohol in the presence of a base.

10. A process for the production of vinyl ether derivatives which comprises treating with phosgene a vinyl ether of the general formula $$R_1O-C(R_2)=CH-R_3$$

where $R_1$ taken individually is an alkyl group containing up to 4 carbon atoms, and taken together with $R_3$ completes with $R_3$ a ring system selected from the 4:5-dihydrofuran and 5:6-dihydropyran rings, $R_2$ is selected from the class consisting of the hydrogen atom and alkyl groups containing up to 4 carbon atoms and $R_3$ taken individually is selected from the class consisting of the hydrogen atom and alkyl groups containing up to 4 carbon atoms and taken together with $R_1$ completes a said ring system, the treatment being effected at a temperature at most equal to room temperature and in the presence of a tertiary base in a quantity at most 0.2 mol equivalent per mol of phosgene and separating the chlorinated ether product from the β-alkoxylated acrylic acid chloride produced by fractional distillation, and thereafter converting the β-alkoxylated acrylic acid into a corresponding ester by reaction with an alcohol in the presence of a base.

No references cited.